(12) United States Patent
Chen et al.

(10) Patent No.: US 10,862,346 B2
(45) Date of Patent: Dec. 8, 2020

(54) FOREIGN OBJECT DETECTION CIRCUIT FOR WIRELESS CHARGER

(71) Applicant: NXP B.V., Eindhoven (NL)

(72) Inventors: Fei Chen, Shanghai (CN); Gang Li, Shanghai (CN); Ping Zhao, Shanghai (CN)

(73) Assignee: NXP B.V., San Jose, CA (US)

( * ) Notice: Subject to any disclaimer, the term of this patent is extended or adjusted under 35 U.S.C. 154(b) by 284 days.

(21) Appl. No.: 15/922,925

(22) Filed: Mar. 16, 2018

(65) Prior Publication Data

US 2019/0165618 A1 May 30, 2019

(30) Foreign Application Priority Data

Nov. 30, 2017 (CN) .......................... 2017 1 1239973

(51) Int. Cl.
| | | |
|---|---|---|
| *H02J 50/60* | (2016.01) | |
| *H02J 7/02* | (2016.01) | |
| *H02J 50/80* | (2016.01) | |
| *H02J 50/10* | (2016.01) | |
| *H02J 50/12* | (2016.01) | |

(52) U.S. Cl.
CPC .............. *H02J 50/60* (2016.02); *H02J 7/025* (2013.01); *H02J 50/80* (2016.02); *H02J 50/10* (2016.02); *H02J 50/12* (2016.02)

(58) Field of Classification Search
None
See application file for complete search history.

(56) References Cited

U.S. PATENT DOCUMENTS

| | | | |
|---|---|---|---|
| 9,465,064 B2 | 10/2016 | Roy et al. | |
| 9,530,558 B2 | 12/2016 | Nakano et al. | |
| 2013/0134792 A1* | 5/2013 | Bunsen .................. | G01R 27/04 307/104 |
| 2013/0241302 A1* | 9/2013 | Miyamoto .............. | H02J 50/12 307/104 |
| 2014/0111153 A1 | 4/2014 | Kwon et al. | |
| 2014/0125287 A1* | 5/2014 | Nakano ................... | H02J 5/005 320/128 |
| 2014/0312833 A1 | 10/2014 | Won et al. | |
| 2015/0372493 A1 | 12/2015 | Sankar | |
| 2016/0149440 A1 | 5/2016 | Staring et al. | |
| 2016/0352155 A1 | 12/2016 | Iwasaki | |
| 2017/0018977 A1 | 1/2017 | Van Wageningen et al. | |
| 2017/0179772 A1* | 6/2017 | Asanuma ................ | H02J 50/90 |
| 2017/0223637 A1 | 8/2017 | Wang et al. | |
| 2019/0310388 A1* | 10/2019 | Park .......................... | H02J 7/02 |

\* cited by examiner

*Primary Examiner* — Jared Fureman
*Assistant Examiner* — Joel Barnett

(57) ABSTRACT

In a wireless charging system, a power-transmitting node (TX), has a processor, a memory, a power transmitter for transmitting power wirelessly to a power-receiving node (RX), and a signal receiver for receiving signals from the RX. After the processor detects the presence of a foreign object (FO) during a power-transfer session, the processor places the TX in a protection state. The processor detects whether the FO has been removed using quality factor (QF) values for the TX that the processor measures before and after detecting the presence of the FO, and without requiring any QF values calibrated off-line. The QF values include a QF value measured before the FO is present, a QF value measured just after the TX enters the protection state, and a current QF value that is repeatedly updated as long as the TX remains in the protection state.

17 Claims, 3 Drawing Sheets

300

FOREIGN OBJECT DETECTION CIRCUIT FOR WIRELESS CHARGER

BACKGROUND

The present invention relates generally to wireless charging systems and, more particularly, to techniques for detecting the presence of foreign objects in wireless charging systems.

In a conventional wireless charging system, a power source (referred to herein as a power-transmitting node or TX) transmits power wirelessly via inductive coupling to a power sink (referred to herein as a power-receiving node or RX) that is placed on or at least near the TX in order to charge or power the RX. The inductive coupling between the TX and the RX is achieved via resonant transducer circuitry in each node having similar if not identical resonant frequencies. To determine whether an RX is present, the TX will periodically or intermittently transmit a ping message and, if present, an RX will respond to a received ping message by transmitting an ack message acknowledging its presence. The TX will respond to a received ack message by transmitting power to the RX. During a power-transfer session, the RX will transmit CEP (control error packet) messages instructing the TX to increase or decrease its transmitted power level.

If a metal foreign objected (FO) is placed on or near a TX during a power-transfer session, inductive coupling between the TX and the FO may result in the generation of heat in the FO that can result in damage to the FO, the TX, and/or the RX. As such, a conventional TX monitors power loss during a power-transfer session, where power loss is defined as the amount of power transmitted by the TX that is not received by the RX.

To enable a TX to determine power loss, a conventional RX monitors its level of received power and periodically or intermittently transmits RP (received power) packets to the TX informing the TX of the received power level. The TX monitors its level of transmitted power and determines the power loss as the difference between the TX transmitted power level and the RX received power level. If the power loss exceeds a specified threshold, then the TX concludes that an FO is present. In that case, the TX terminates the power-transfer session and enters a protection state in which the TX cannot transfer power to the RX.

After entering the protection state, if the TX determines that the FO is no longer present, then the TX can return to a non-protection state and initiate another power-transfer session to the RX. To determine when the FO is no longer present, a conventional TX measures a quality factor (QF) value that characterizes its resonant transducer circuitry used for wireless power transfer. When no RX and no FO are present, the QF value for a TX will be relatively high. Because an RX's resonant transducer circuitry is designed to resonate at a similar frequency as a TX's resonant transducer circuitry, when an RX is present (but not an FO), the QF value for the TX will still be relatively high. However, when a random FO is present, like a coin, a key, or other metal object, then the QF value for the TX will be relatively low, whether or not an RX is also present.

A conventional TX is calibrated off-line during factory testing without either an RX or an FO present to determine precisely a highly accurate, calibrated QF value for the TX, where the calibrated QF value is programmed into the TX. Since the TX is calibrated without an RX or an FO present, the calibrated QF value will be relatively high. During real-time operations, when an FO is placed near the TX during a power-transfer session, the TX detects the presence of the FO (based on the determined power loss) and enters the protection state.

During the protection state, the TX partially energizes its resonant transducer circuitry, measures its current QF value, and compares the current QF value to its programmed, calibrated QF value to determine whether the FO is present. If the current QF value is lower than the calibrated QF value, then the TX determines that the FO is present, and the TX remains in the protection state. If the current QF value is similar to the calibrated QF value, then the TX determines that the FO has been removed, and the TX transitions to a non-protection state, thereby enabling the TX to initiate another power-transfer session to the RX.

It would be advantageous to have a TX that does not require factory programming of calibrated QF values.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the invention are disclosed herein. However, specific structural and functional details disclosed herein are merely representative for purposes of describing example embodiments of the invention. The invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In certain embodiments, the present invention is a power-transmitting node (TX) for transmitting power wirelessly to a power-receiving node (RX) in a wireless charging system. The TX comprises a processor that measures quality factor (QF) values for the TX before and after detecting presence of a foreign object (FO), and uses the QF values to determine whether the FO has been removed. A memory is used to store the QF values measured by the processor. A power transmitter transmits the power wirelessly to the RX. A signal receiver receives signals from the RX.

The TX detects whether a FO has been removed using QF values for the TX that the TX measured before and after detecting the presence of the FO and without using any calibrated QF values. In one embodiment, after the TX detects the presence of the FO, the TX transitions to a protection state, and the TX determines whether the FO has been removed using (i) a QF value measured by the TX before the FO is present, (ii) a QF value measured by the TX just after the TX enters the protection state, and (iii) a current QF value measured by the TX while the TX remains in the protection state.

Figure 1:
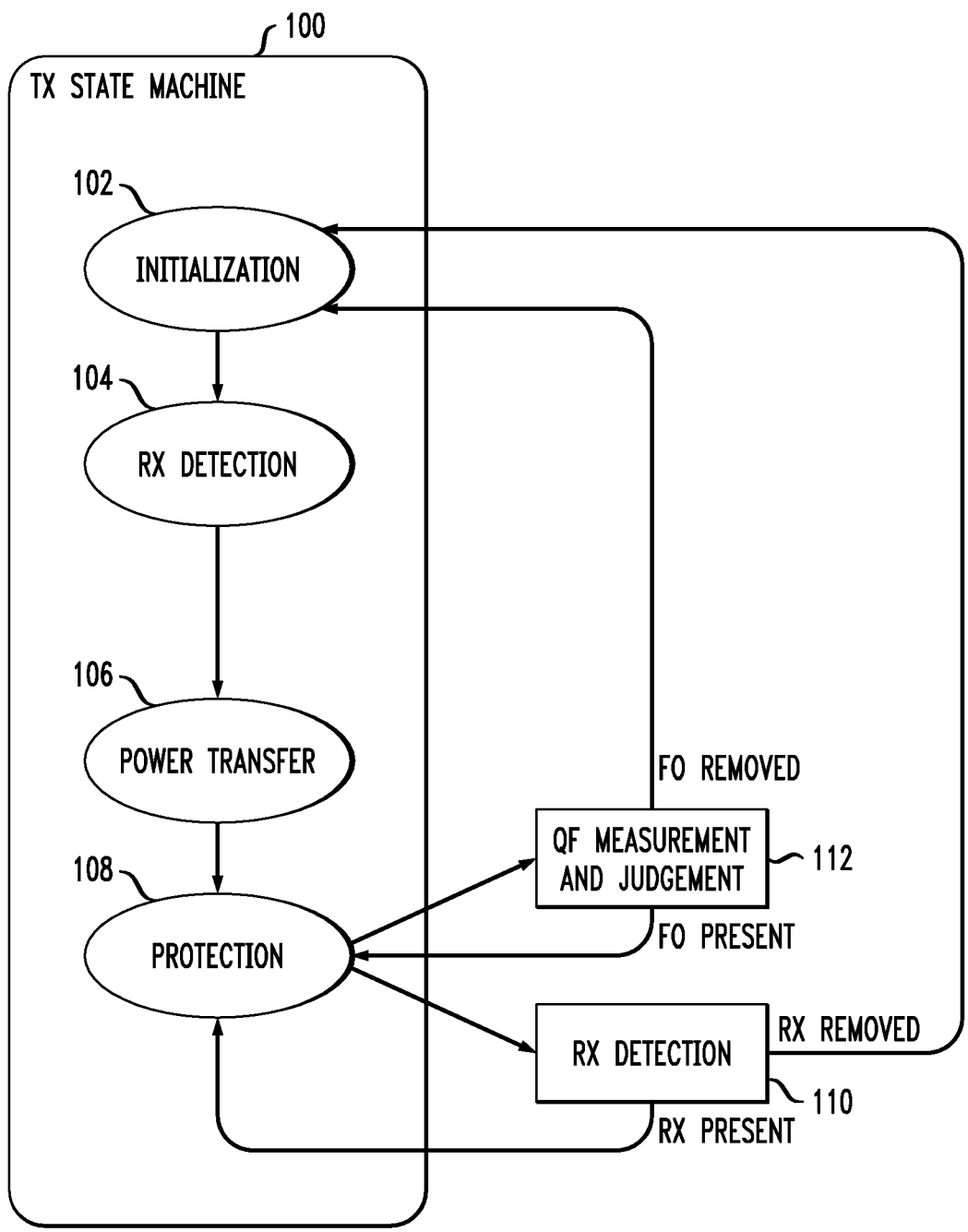
FIG. 1 is a state diagram of a state machine for a TX according to an embodiment of the present invention.

FIG. 1 is a state machine diagram of the state machine 100 for a TX according to one embodiment of the invention. FIG. 1 shows four states: initialization, RX detection, power transfer, and protection. Depending on the implementation, in addition to the RX detection state, there may be other conventional states between the initialization state and the power-transfer state that are not directly related to the invention and are not shown in FIG. 1.

Following the initialization state 102, which is similar to the initialization state of a conventional TX, the TX enters the RX detection state 104, during which the TX transmits ping messages until a power-receiving node (RX) responds with an ack message indicating to the TX that the RX is present. If and when the TX receives an ack message, the TX state machine 100 will transition to the power-transfer state 106, during which the TX transmits power wirelessly to the RX. If and when the TX detects the presence of an FO by determining that the power loss is greater than the specified power-loss threshold level, the TX will transition to the protection state 108. If and when certain conditions are met (described below), the TX will return to the initialization state 102.

Figure 2:
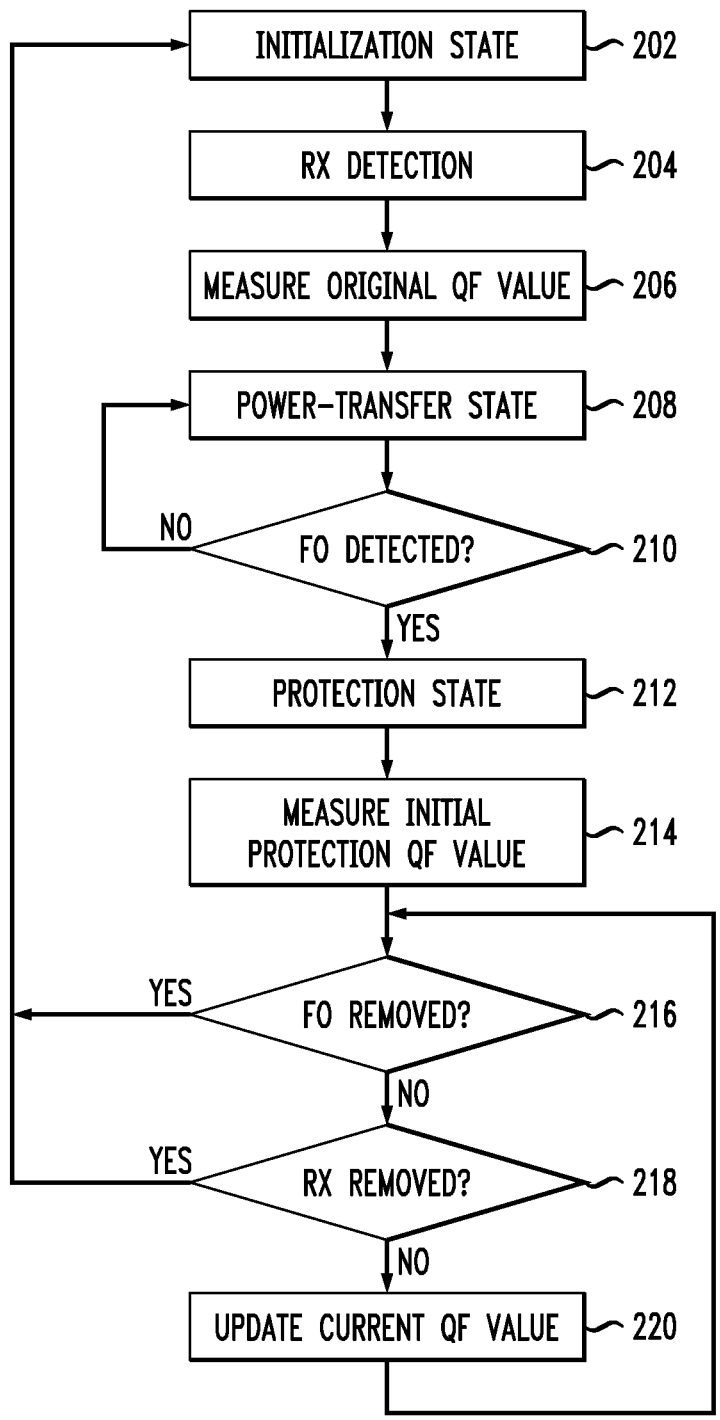
FIG. 2 is a flow chart of the processing performed by a TX implementing the TX state machine of FIG. 1 according to an embodiment of the present invention.

FIG. 2 is a flow diagram of the processing performed by a TX implementing the TX state machine 100 of FIG. 1 according to one embodiment of the invention. Processing begins at step 202, in which the TX enters the initialization state 102 of FIG. 1 and performs functions similar to the conventional initialization functions of a conventional TX in a conventional wireless charging system.

In step 204, the TX detects the presence of an RX. In particular, the TX intermittently executes digital pings and, when the RX is present and transmits a corresponding ack message, the TX detects the ack message from the RX, thereby determining that the RX is present. The term "digital ping" refers to the TX inserting energy into its resonant transducer circuitry, which thereby transfers power to the RX's resonant transducer circuitry, which in turn causes the RX to power up and transmit an ack message back to the TX. Following RX detection, in step 206, the TX measures and stores its current quality factor (QF) value as its baseline or original QF value (orig_QF). Note that, as described further below, when step 206 is performed, in addition to the RX, an FO might or might not also be present.

In step 208, the TX enters the power-transfer state 106 of FIG. 1, during which the TX transmits power to the RX. During the power-transfer session, the TX receives CEP packets from the RX and, in response, tunes its transmitted power level accordingly. The TX also receives RP packets from the RX informing the TX of the RX's received power level. The TX monitors and compares its own transmitted power level to the RX's received power level to characterize the amount of power loss.

In step 210, the TX compares the power loss to a specified power-loss threshold level to determine whether or not an FO is present. If the power loss does not exceed the specified power-loss threshold level, then the TX determines that an FO is not present, and processing returns to step 208 to continue the current power-transfer session. If and when the power loss exceeds the specified power-loss threshold level, then the TX determines that an FO is present and, in step 212, the TX terminates the power-transfer session and enters the protection state 108 of FIG. 1.

In step 214, the TX measures and stores its QF value upon entering the protection state 108 as both its initial protection QF value (enter_QF) and its current QF value (curr_QF).

In step 216, the TX determines whether or not the FO has been removed. This processing is described further below. If the TX determines that the FO has been removed, then processing returns to step 202 to re-enter the initialization state 102 in anticipation of another power-transfer session to the same RX or a different RX. Otherwise, the TX determines that the FO has not been removed and processing proceeds to step 218. The processing of step 216 is represented in FIG. 1 by QF measurement and judgement 112.

In step 218, the TX determines whether or not the RX has been removed. In particular, the TX executes a digital ping and waits to receive a corresponding ack message from the RX in return. If an ack message is not received within a specified time period, then the TX determines that the RX has been removed, and processing returns to step 202 to re-enter the initialization state 102. Note that, in some implementations, the TX executes a specified number of unanswered digital pings before determining that the RX is no longer present. In any case, if the TX receives an ack message, then the TX determines that the RX is still present, and processing proceeds to step 220, where the TX re-measures its QF value and uses that value to update its current QF value (curr_QF). Processing then returns to step 216 to determine whether or not the FO has been removed using the updated curr_QF value. The processing of step 218 is represented in FIG. 1 by RX detection 110.

Referring again to step 216, the TX evaluates the following logic formula to determine whether or not the FO has been removed:

$$(((orig\_QF-enter\_QF) > thresh1) \,\&\&\, ((orig\_QF-curr\_QF) < thresh1))$$

OR $$((abs(orig\_QF-enter\_QF) < thresh2) \,\&\&\, ((curr\_QF-orig\_QF) > thresh3))$$

where:
  orig_QF is the QF value measured in step 206;
  enter_QF is the QF value measured in step 214;
  curr_QF is the QF value initially measured in step 214 and then updated in step 220; and
  thresh1, thresh2, and thresh3 are three specified QF threshold levels, where thresh1 is used to judge how close curr_QF is to orig_QF, thresh2 is used to accommodate normal QF measurement variances, and thresh3 is used to judge how far curr_QF is to orig_QF.

If the TX evaluates the logic formula as being true, then the TX determines that the FO has been removed. Otherwise, the TX evaluates the logic formula as being false and determines that the FO has not been removed. The application of the logic formula to different situations is described below.

The following discussion of the application of the logic formula is based on an example implementation in which the relatively high QF value for a TX without an FO present is about 100-120, and the relatively low QF value for a TX with an FO present is about 20-30. In this example implementation, thresh1 and thresh3 are both 50, and thresh2 is 15.

In order to operate properly, a wireless charging system should be able to handle (i) situations in which an FO is placed near a TX before the TX has begun to transfer power to an RX as well as (ii) situations in which the FO is placed near a TX while the TX is transmitting power to an RX. These two situations are discussed separately below.

In the first type of situation, an FO is placed near a TX before the TX has begun to transfer power to an RX. Since the TX will not begin to transfer power until after an RX is present, this first type of situation involves instances when the FO is placed near the TX before the RX is present as well as instances when the FO and the RX are placed near the TX at the same time. Either way, when the RX is placed near the TX, the TX detects the RX in step 204 of FIG. 2, and the TX then measures the original QF value (orig_QF) in step 206. Because the FO is present at this time, orig_QF will be relatively low (e.g., about 20-30).

Because the FO is present, soon after the TX enters the power-transfer state 106 in step 208, the TX detects the presence of the FO in step 210 and transitions to the protection state 108 in step 212. With the FO present, the QF values enter_QF and curr_QF measured by the TX in step 214 will still be relatively low. In that case, all three QF values orig_QF, enter_QF, and curr_QF will be relatively low and will be close to each other.

Note that, even though both the RX and the FO were present for both steps 206 and 214, there may be small differences between QF values measured at different times such that the QF value measured as step 206 may be slightly greater than, slightly less than, or equal to the QF value measured at step 214. In this example implementation, the QF value measured as step 206 is assumed to be 26, and the QF value measured as step 214 is assumed to be 24. In that case, when the logic formula is evaluated at step 216 for the first time following step 214, orig_QF=26, enter_QF=24, and curr_QF=24.

Substituting these three QF values and the three different QF threshold values thresh1, thresh2, and thresh3 into the logic formula of step 216 yields:

(((26−24)>50)&&((26−24)<50))

OR ((abs(26−24)<15)&&((24−26)>50))

which evaluates as false. As such, the TX will correctly determine that the FO has not been removed, and processing will continue to step 218, where the TX determines whether or not the RX has been removed. Assuming that the RX has also not been removed, processing continues to step 220, where the TX re-measures its QF value and updates curr_QF. In this example implementation, the QF value measured at step 220 is still 24, such that curr_QF remains at 24. (Note that, if the TX determines in step 218 that the RX has been removed, then processing returns to step 202 to re-initialize the TX with the FO still present to await the arrival of another RX or the same RX.)

After updating curr_QF in step 220, processing returns to step 216 to re-evaluate the logic formula. As long as the FO remains present (and the RX also remains present) and even if curr_QF varies slightly, the TX will continue to evaluate the logic formula to be false in step 216 and thereby correctly determine that the FO is still present.

If and when the FO is removed while the TX is still in the protection state 108, the current QF value (curr_QF) measured by the TX in step 220 will be relatively high, for this example implementation, 110. In that case, when the TX next evaluates the logic formula in step 216, curr_QF will be 110, while orig_QF=26 and enter_QF=24.

Substituting these three QF values and the three different QF threshold values into the logic formula yields:

(((26−24)>50)&&((26−110)<50))

OR ((abs(26−24)<15)&&((110−26)>50))

which evaluates as true. As such, the TX will correctly determine that the FO has been removed, and processing will return to step 202.

Thus, in the first type of situation in which the FO is placed near the TX before the TX begins to transfer power to the RX, the TX will correctly determine whether or not the FO has been removed.

In the second type of situation, a FO is placed near a TX after the TX has already begun to transmit power to an RX, while the TX is still in the power-transfer state 106. This means that the TX would have measured the original QF value in step 206 after the RX was present, but before the FO was present. As such, orig_QF will be relatively high, for this example implementation, 110.

When the FO is placed near the TX during the power-transfer session, the TX will detect the presence of the FO in step 210 and transition from the power-transfer state 106 to the protection state 108 in step 212.

With the FO present, the QF values enter_QF and curr_QF measured by the TX in step 214 will be relatively low, for this example implementation, 24. In that case, orig_QF=110, enter_QF=24, and curr_QF=24.

Substituting these three QF values and the three different QF threshold values into the logic formula of step 216 yields:

(((110−24)>50)&&((110−24)<50))

OR ((abs(110−24)<15)&&((24−110)>50))

which evaluates as false. As such, the TX will correctly determine that the FO has not been removed, and processing will continue to step 218, where the TX determines whether or not the RX has been removed. Assuming that the RX has also not been removed, processing will continue to step 220, where the TX re-measures its QF value and updates curr_QF. In this example implementation, the QF value measured at step 220 is still 24, such that curr_QF remains at 24. Note that, if the TX determines in step 218 that the RX has been removed, then processing will return to step 202 to re-initialize the TX with the FO present to await the arrival of another RX or the same RX.

After updating curr_QF in step 220, processing returns to step 216 to re-evaluate the logic formula. As long as the FO remains present (and the RX also remains present) and even if curr_QF varies slightly, the TX will continue to evaluate the logic formula to be false in step 216 and thereby correctly determine that the FO is still present.

If and when the FO is removed while the TX is still in the protection state 108, the current QF value (curr_QF) measured by the TX in step 220 will be relatively high, for this example implementation, 105. In that case, when the TX next evaluates the logic formula in step 216, curr_QF will be 105, while orig_QF=110 and enter_QF=24.

Substituting these three QF values and the three different QF threshold values into the logic formula yields:

$$(((110-24)>50)\&\&((110-105)<50))$$

OR $$((abs(110-24)<15)\&\&((105-110)>50))$$

which evaluates as true. As such, the TX will correctly determine that the FO has been removed, and processing will return to step 202.

Thus, in the second type of situation in which the FO is placed near the TX while the TX is transferring power to the RX, the TX will again correctly determine whether or not the FO has been removed.

Figure 3:
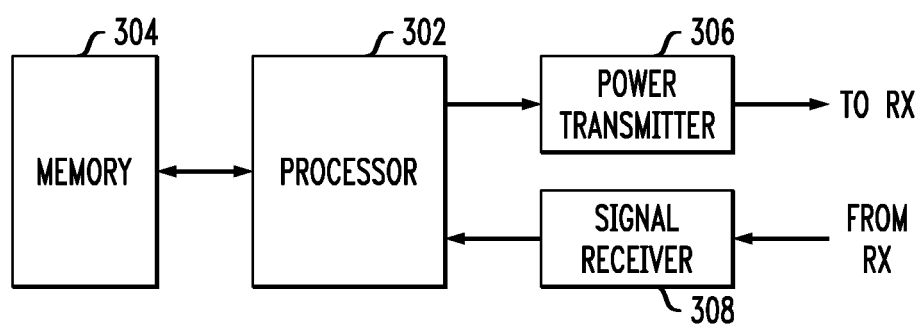
FIG. 3 is a simplified block diagram of a TX according to an embodiment of the present invention.

FIG. 3 is a simplified block diagram of a TX 300 according to one embodiment of the invention. Processor 302 implements the state machine 100 of FIG. 1 and the method of FIG. 2. Memory 304 stores the three different QF values orig_QF, enter_QF, and curr_QF and the three QF threshold levels thresh1, thresh2, and thresh3 used by the processor 302. Power transmitter 306 transmits power wirelessly to an RX, and signal receiver 308 receives CEP and RP packets from the RX. Note that, in typical implementations, the power transmitter 306 and the signal receiver 308 share resonant transducer circuitry that converts between wired and wireless electromagnetic signals. In other possible implementations, the power transmitter 306 and the signal receiver 308 may be completely distinct components.

The processor 302 may be implemented using dedicated hardware as well as hardware capable of executing appropriate software. The functions of the processor 302 may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP), network processor, application specific integrated circuit (ASIC), and/or field programmable gate array (FPGA) circuitry. Other hardware, conventional and/or custom, may also be included.

The memory 304 may be any suitable circuitry for storing data and/or software, such as, without limitation, read only memory (ROM), random access memory (RAM), and/or non-volatile storage circuitry, and may be integrated with the processor 302 and/or implemented as a distinct component.

Although the invention has been described in the context of a particular logic formula, those skilled in the art will understand that other logic formulas can be implemented to achieve the same results of avoiding false positives (i.e., detecting FO removal when the FO remains) and false negatives (i.e., failing to detect FO removal), while achieving both true positives (i.e., correctly detecting FO removal) and true negatives (i.e., correctly detecting FO non-removal).

The present invention is advantageous because it does not require a system calibration at the factory. The present invention also allows for early termination of the protection mode and prompt resuming of TX power transfer when the FO is removed Although the invention has been described in the context of a TX that receives wireless data packets directly from an RX, the invention may be implemented in other contexts involving other suitable modes of communication from the RX to the TX, including (but not limited to) indirect communication modes and/or communication modes involving one or more wired links.

The present invention eliminates the need to perform precise, off-line calibration and storage of highly accurate QF values for TXs in wireless charging systems. Instead, the present invention takes advantage of the ability of the TX to measure its QF values in real time using techniques that need not be as precise as conventional off-line, calibration techniques.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A power-transmitting node (TX) for transmitting power wirelessly to a power-receiving node (RX) in a wireless charging system, the TX comprising:
   a processor that (i) measures an original QF value (orig_QF) for the TX prior to transmitting power to the RX (ii) places the TX in a protection state upon detecting the presence of a foreign object (FO) (iii) measures an initial protection-state QF value (enter_QF) and a current QF value (curr_QF) for the TX upon entering the protection state and (iv) determines whether the FO has been removed based on the orig_QF, enter_QF, and curr_QF values;
   a memory that stores the orig_QF, enter_QF, and curr_QF values;
   a power transmitter that transmits the power wirelessly to the RX; and
   a signal receiver that receives signals from the RX.

2. The TX of claim 1, wherein:
   if the processor detects that the FO has been removed, then the processor causes the TX to leave the protection state; and
   if the processor detects that the FO has not been removed, then the processor causes the TX to remain in the protection state.

3. The TX of claim 2, wherein:
if the processor causes the TX to remain in the protection state, then the processor detects whether the RX has been removed;
if the processor detects that the RX has been removed, then the processor causes the TX to leave the protection state; and
if the processor detects that the RX has not been removed, then the processor (i) causes the TX to remain in the protection state; (ii) re-measures and updates the curr_QF value and (iii) detects whether the FO has been removed based on the orig_QF, enter_QF, and updated curr_QF values.

4. The TX of claim 3, wherein:
the processor detects whether the FO has been removed by evaluating a logic formula based on threshold differences between the orig_QF, enter_QF, and updated curr_QF values; the logic formula is:

$$(((orig\_QF-enter\_QF)>thresh1)\&\&((orig\_QF-curr\_QF)<thresh1))$$

OR $$((abs(orig\_QF-enter\_QF)<thresh2)\&\&((curr\_QF-orig\_QF)>thresh3))$$

wherein thresh1, thresh2, and thresh3 are three specified QF threshold levels;
the signal receiver receives the signals wirelessly from the RX; the power transmitter and the signal receiver share resonant transducer circuitry;
the QF factor corresponds to the shared resonant transducer circuitry of the TX; and
the processor detects whether the FO has been removed without using any calibrated QF values.

5. The TX of claim 1, wherein the processor detects whether the FO has been removed by evaluating a logic formula based on threshold differences between the orig_QF, enter_QF, and updated curr_QF values.

6. The TX of claim 5, wherein the logic formula is:

$$(((orig\_QF-enter\_QF)>thresh1)\&\&((orig\_QF-curr\_QF)<thresh1))$$

OR $$((abs(orig\_QF-enter\_QF)<thresh2)\&\&((curr\_QF-orig\_QF)>thresh3))$$

wherein thresh1, thresh2, and thresh3 are three specified QF threshold levels.

7. The TX of claim 1, wherein the signal receiver receives the signals wirelessly from the RX.

8. The TX of claim 7, wherein:
the power transmitter and the signal receiver share resonant transducer circuitry; and
the QF factor corresponds to the shared resonant transducer circuitry of the TX.

9. The TX of claim 1, wherein the processor detects whether the FO has been removed without using any calibrated QF values.

10. A method for a TX transmitting power wirelessly to an RX in a wireless charging system, the method comprising:
transmitting the power wirelessly to the RX;
receiving signals from the RX;
detecting presence of an FO based on a level of the power transmitted to the RX and a level of power received by the RX;
measuring an original QF value (orig_QF) for the TX prior to transmitting the power to the RX;
placing the TX in a protection state upon detecting the presence of the FO;
measuring an initial protection-state QF value (enter_QF) and a current QF value (curr_QF) for the TX upon entering the protection state; and
detecting whether the FO has been removed based on the orig_QF, enter_QF, and curr_QF values.

11. The method of claim 10, wherein:
if removal of the FO is detected, then causing the TX to leave the protection state; and
if the removal of the FO is not detected, then causing the TX to remain in the protection state.

12. The method of claim 11, wherein:
if the TX remains in the protection state, then detecting whether the RX has been removed;
if removal of the RX is detected, then causing the TX to leave the protection state; and
if the removal of the RX is not detected, then (i) causing the TX to remain in the protection state; (ii) re-measuring and updating the curr_QF value and (iii) detecting whether the FO has been removed based on the orig_QF, enter_QF, and updated curr_QF values.

13. The method of claim 10, wherein the removal of the FO is detected by evaluating a logic formula based on threshold differences between the orig_QF, enter_QF, and updated curr_QF values.

14. The method of claim 13, wherein the logic formula is:

$$(((orig\_QF-enter\_QF)>thresh1)\&\&((orig\_QF-curr\_QF)<thresh1)) \text{ OR}$$

$$((abs(orig\_QF-enter\_QF)<thresh2)\&\&((curr\_QF-orig\_QF)>thresh3))$$

wherein thresh1, thresh2, and thresh3 are three specified QF threshold levels.

15. The method of claim 10, further comprising receiving the signals wirelessly from the RX.

16. The method of claim 15, wherein the QF factor corresponds to shared resonant transducer circuitry of the TX.

17. The method of claim 10, further comprising detecting whether the FO has been removed without using any calibrated QF values.

* * * * *